(12) United States Patent
Luo et al.

(10) Patent No.: US 11,708,496 B2
(45) Date of Patent: Jul. 25, 2023

(54) METHOD OF PRODUCING POWDER COATING MATERIAL

(71) Applicant: AGC Inc., Chiyoda-ku (JP)

(72) Inventors: Lei Luo, Shanghai (CN); Zhehong Wang, Shanghai (CN); Ken Iruya, Shanghai (CN)

(73) Assignee: AGC Inc., Chiyoda-ku (JP)

( * ) Notice: Subject to any disclaimer, the term of this patent is extended or adjusted under 35 U.S.C. 154(b) by 227 days.

(21) Appl. No.: 16/912,790

(22) Filed: Jun. 26, 2020

(65) Prior Publication Data

US 2020/0325346 A1 Oct. 15, 2020

Related U.S. Application Data

(63) Continuation of application No. PCT/JP2018/047582, filed on Dec. 25, 2018.

(30) Foreign Application Priority Data

Dec. 27, 2017 (CN) .......................... 201711446495.0

(51) Int. Cl.
*C09D 5/03* (2006.01)
*B29C 48/52* (2019.01)
(Continued)

(52) U.S. Cl.
CPC .................. *C09D 5/03* (2013.01); *B29B 7/42* (2013.01); *B29B 7/421* (2013.01); *B29B 7/48* (2013.01); *B29B 7/482* (2013.01); *B29B 7/484* (2013.01); *B29C 48/04* (2019.02); *B29C 48/395* (2019.02); *B29C 48/40* (2019.02); *B29C 48/52* (2019.02);
(Continued)

(58) Field of Classification Search
None
See application file for complete search history.

(56) References Cited

U.S. PATENT DOCUMENTS

2016/0160054 A1* 6/2016 Saito .................... C09D 163/00
524/81
2017/0247563 A1 8/2017 Saito et al.

FOREIGN PATENT DOCUMENTS

EP 3395919 A1 10/2018
JP 53-42219 4/1978
(Continued)

OTHER PUBLICATIONS

"Processing and Troubleshooting Guide." Celanese, Sep. 2013, p. (Year: 2013).*

(Continued)

*Primary Examiner* — Alison L Hindenlang
*Assistant Examiner* — Andrés E. Behrens, Jr.
(74) *Attorney, Agent, or Firm* — Element IP, PLC

(57) ABSTRACT

The present invention relates to a method of producing a powder coating material containing a fluororesin and a non-fluororesin. The method of producing a powder coating material includes kneading a raw material containing the fluororesin and the non-fluororesin with a kneading extruder equipped with a screw having a kneading zone, wherein a ratio of a length $L_K$ of the kneading zone to an effective length $L_S$ of the screw ($L_K/L_S \times 100$) is 21.0 to 50.0%.

18 Claims, 5 Drawing Sheets

(51) Int. Cl.
| | |
|---|---|
| *B29C 48/04* | (2019.01) |
| *B29C 48/00* | (2019.01) |
| *C09D 167/00* | (2006.01) |
| *B29B 7/48* | (2006.01) |
| *B29B 7/42* | (2006.01) |
| *B29C 48/40* | (2019.01) |
| *B29C 48/395* | (2019.01) |
| *B29C 48/57* | (2019.01) |
| *B05D 1/06* | (2006.01) |
| *B29B 7/46* | (2006.01) |
| *B29B 7/40* | (2006.01) |
| *B29C 48/39* | (2019.01) |

(52) U.S. Cl.
CPC ............ *B29C 48/57* (2019.02); *C09D 167/00* (2013.01); *B05D 1/06* (2013.01); *B29B 7/40* (2013.01); *B29B 7/46* (2013.01); *B29C 48/397* (2019.02)

(56) References Cited

FOREIGN PATENT DOCUMENTS

| | | | | |
|---|---|---|---|---|
| JP | 2011/245710 | * | 5/2010 | ............ B29C 48/40 |
| JP | 2011245710 | * | 5/2010 | ............ B29C 48/40 |
| JP | 2012/111834 | * | 11/2010 | ........... C09D 199/00 |
| JP | 2011-01 2119 A | | 1/2011 | |
| JP | 2012250399 | * | 6/2011 | ........... B29C 48/395 |
| JP | 2012111834 | * | 11/2011 | |
| JP | 2012-111833 A | | 6/2012 | |
| JP | 2012-111834 A | | 6/2012 | |
| WO | WO 2016/052111 A1 | | 4/2016 | |
| WO | WO 2016/080220 A1 | | 5/2016 | |

OTHER PUBLICATIONS

JP-2012/111,834 (Takahashi) Nov. 2010 (online machine translation), [Retrieved on Apr. 13, 2022], Retrieved from: Espacenet (Year: 2010).*

Gaspar-Cunha, Antonia, and Jose Antonio Covas. Optimization in Polymer Processing (Chemical Engineering Methods and Technology). UK ed., Nova Science Pub Inc, 2011. (Year: 2011).*

JP-2011/245,710 (Hitoshi) May 2010 (online machine translation), [Retrieved on Apr. 13, 2022]. Retrieved from: Espacenet (Year: 2010).*

Angadi, Gangadhar, et al. "Effect of Screw Configuration on the Dispersion of Nanofillers in Thermoset Polymers." Journal of Polymer Engineering, vol. 37, No. 8, 2017, pp. 815-825. Crossref, https://doi.org/10.1515/polyeng-2015-0427. (Year: 2017).*

Sustainable Plastics: Environmental Assessments of Biobased, Biodegradable, and Recycled Plastics, First Edition. Joseph P. Greene. Appendix B © 2014 John Wiley & Sons, Inc. Published 2014 by John Wiley & Sons, Inc. (Year: 2014).*

Sustainable Plastics: Environmental Assessments of Biobased, Biodegradable, and Recycled Plastics, First Edition. Joseph P. Greene. Appendix A © 2014 John Wiley & Sons, Inc. Published 2014 by John Wiley & Sons, Inc. (Year: 2014).*

Https://web.archive.org/web/20170731015936/https://en.wikipedia.org/wiki/Polyvinylidene_fluoride. Wikipedia, Jul. 31, 2017 (Year: 2017).*

JP-2011245710 (Hitoshi) May 2010 (online machine translation), [Retrieved on Dec. 3, 2022]. Retrieved from: Espacenet (Year: 2010).*

JP-2012111834 (Takahashi) May 2011 (online machine translation), [Retrieved on Nov. 1, 2022]. Retrieved from: Espacenet (Year: 2011).*

JP-2012250399 (Kaneko) May 2011 (online machine translation), [Retrieved on Nov. 1, 2022]. Retrieved from: Espacenet (Year: 2011 ).*

Fedors, "A Method for Estimation Both the Solubility Parameters and Molar Volumes of Liquids", Polymer Engineering and Science, vol. 14, No. 2, 1974, pp. 147-154.

Keiji Sawada , "Easy-to-understand extrusion molding technology", Kogyo Chosakai Publishing Co., Ltd., Apr. 20, 2008, (with Partial English Translation), 18 pages.

"Resin kneading with a twin-screw extruder", Technical Information Institute Co., Ltd, Jun. 30, 2011, (with Partial English Translation), 20 pages.

* cited by examiner

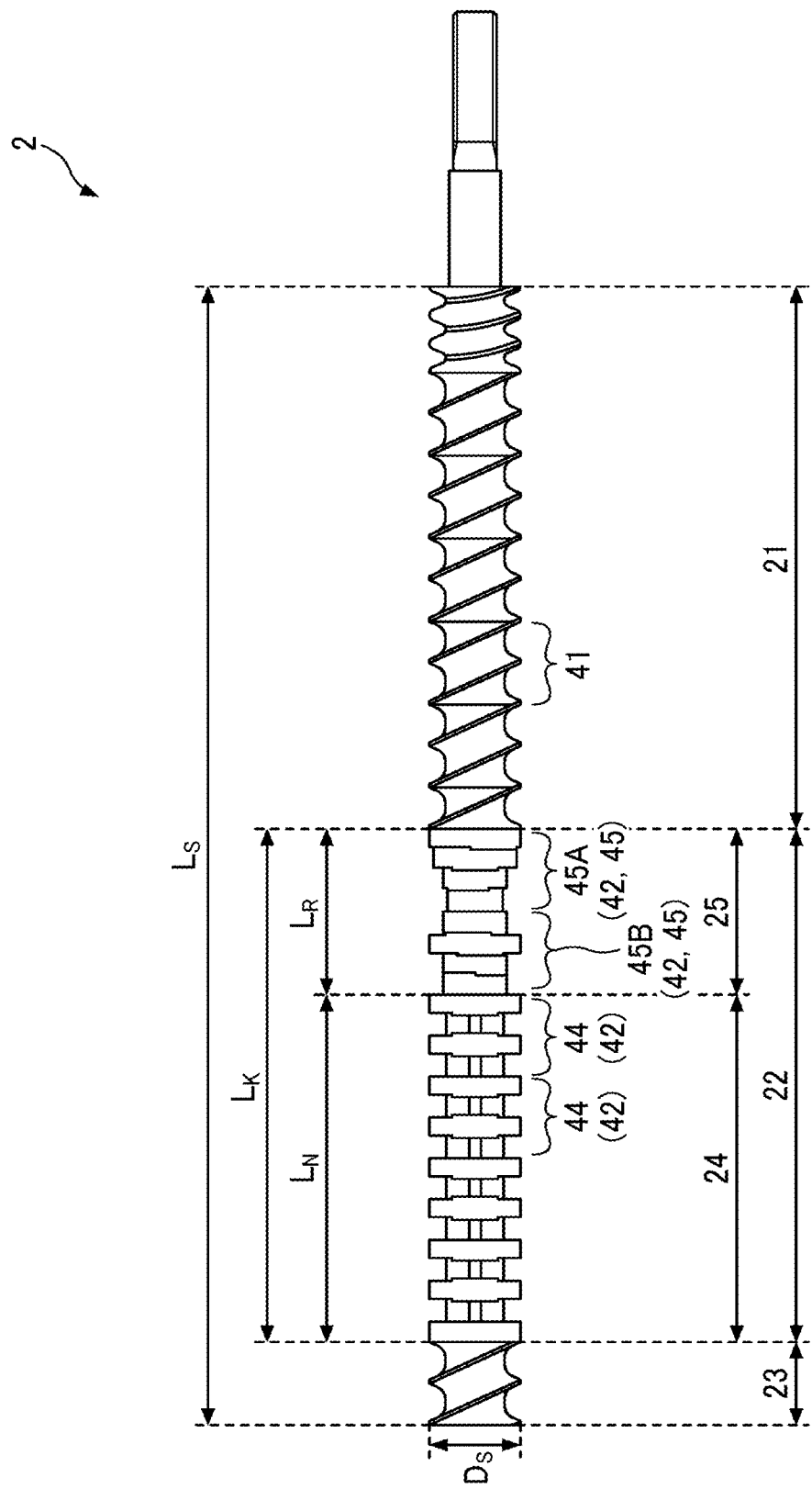

METHOD OF PRODUCING POWDER COATING MATERIAL

CROSS-REFERENCE TO RELATED APPLICATIONS

This U.S. non-provisional application is a continuation application of and claims the benefit of priority under 35 U.S.C. § 365(c) from PCT International Application PCT/JP2018/047582 filed on Dec. 25, 2018, which is designated the U.S., and is based upon and claims the benefit of priority of Chinese Patent Application No. 201711446495.0 filed on Dec. 27, 2017, the entire contents of which are incorporated herein by reference.

FIELD OF THE INVENTION

The present invention relates to a method of producing a powder coating material.

BACKGROUND OF THE INVENTION

In recent years, powder coatings containing no volatile organic compound (VOC) have been attracting attention from the viewpoint of environmental protection in the field of coating.

Among such powder coatings, powder coatings containing a fluororesin have been developed as coatings for improving weather resistance and the like.

Furthermore, a hybrid powder coating material containing a fluororesin and a non-fluororesin has been proposed for the purpose of cost reduction. For example, Patent Document 1 describes a powder coating material containing a fluororesin and a polyester resin, in which the fluororesin forms an upper layer and the polyester resin forms a lower layer in a cured film.

RELATED-ART DOCUMENT

Patent Documents

Patent document 1: Japanese Unexamined Patent Publication No. 2011-12119

SUMMARY OF THE INVENTION

Problems to be Solved by the Invention

The hybrid powder coating as described in Patent Document 1 can be prepared by melt-kneading raw materials, solidifying the resulting melt product, and crushing the product. However, the present inventors have found that the cured film formed from the powder coating described in Patent Document 1 has insufficient layer separation. In particular, depending on the conditions of melt-kneading, the resulting cured film may not be well separated, and the fluororesin may not be continuously arranged on the horizontal surface of the cured film surface, which may reduce the weather resistance of the cured film.

In view of the above points, the present invention is a method of producing a hybrid powder coating material containing a fluororesin and a non-fluororesin, and an object of the present invention is to provide a production method of a powder coating material containing a fluororesin and a non-fluororesin, wherein an upper layer containing the fluororesin and a lower layer containing the non-fluororesin are layer-separated, and a cured film in which the fluororesin is formed as a continuous upper layer in the horizontal direction on the surface of the cured film.

Means for Solving the Problems

The present inventors have found that the above problems can be solved by the following. A method of producing a powder coating material containing a fluororesin and a non-fluororesin includes a step of using a kneading extruder equipped with a screw having a kneading zone, and a step of kneading a raw material containing the fluororesin and the non-fluororesin, wherein a ratio of a length $L_K$ of the kneading zone to an effective length $L_S$ of the screw ($L_K/L_S \times 100$) is 21.0 to 50.0%.

Effects of the Invention

The present invention is a method of producing a hybrid powder coating material containing a fluororesin and a non-fluororesin, and an object of the present invention is to provide a method for producing a powder coating material containing a fluororesin and a non-fluororesin, wherein an upper layer containing the fluororesin and a lower layer containing the non-fluororesin are layer-separated, and a cured film in which the fluororesin is formed as a continuous upper layer in the horizontal direction on the surface of the cured film.

BRIEF DESCRIPTION OF THE DRAWINGS

FIG. 2 is a figure which shows the structure of the screw of the kneading extruder used in one embodiment of the present invention.

DETAILED DESCRIPTION

Figure 1:
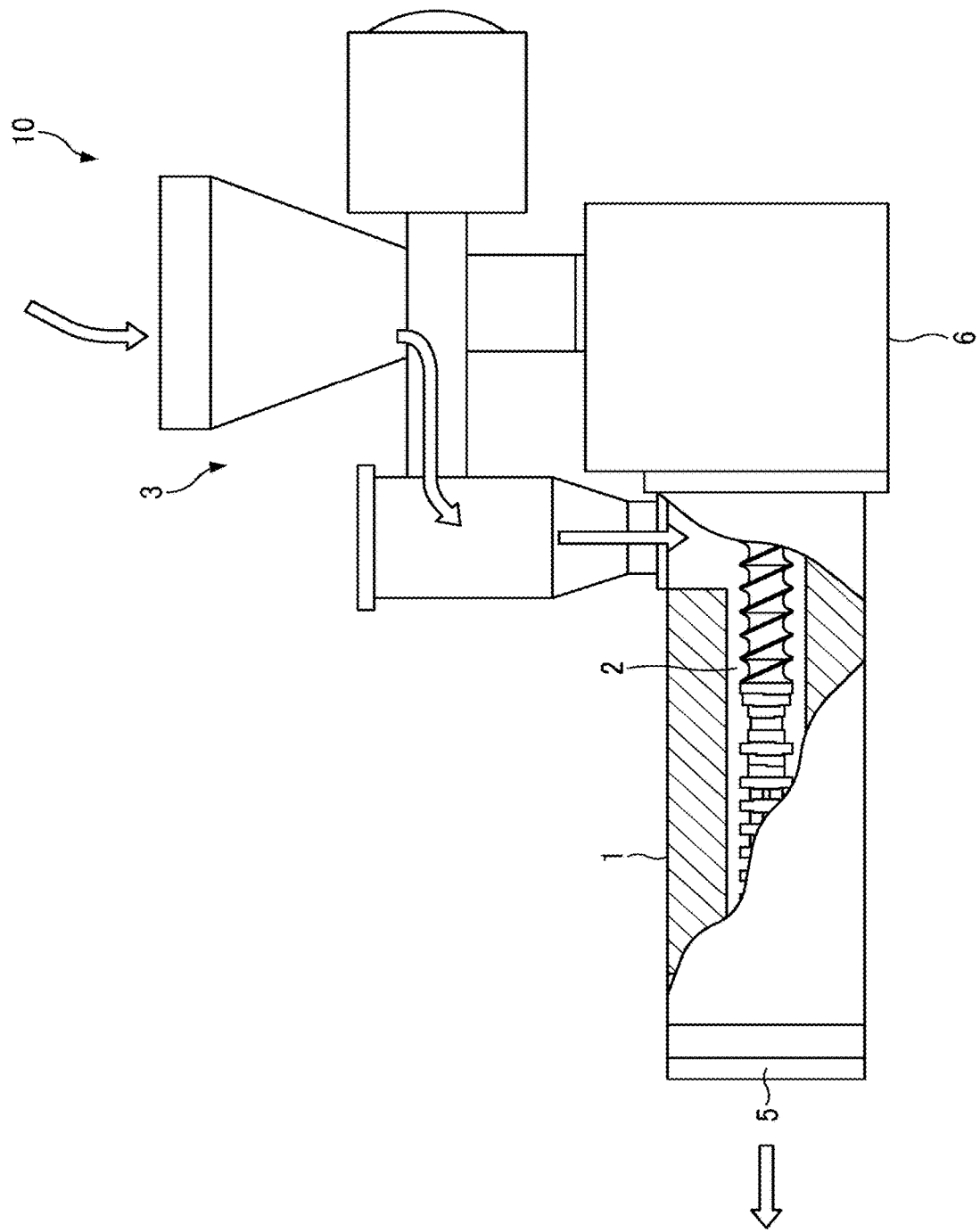
FIG. 1 is a partial breakaway view for explaining the structure of the kneading extruder used in one embodiment of the present invention.

The meanings of the terms in the present invention are as follows.

(Meth)acrylic is a general term for acrylic and methacrylic, and (meth)acrylate is a general term for acrylate and methacrylate.

A unit in a polymer is a generic term for the group of atoms form one molecule of a monomer, and the group of atoms obtained by chemically converting a part of the group of atoms.

The content (mol %) of each unit with respect to all units contained in the polymer is determined by analyzing the polymer by a nuclear magnetic resonance spectrum (NMR) method.

The acid value and the hydroxyl value are values measured in accordance with the method of JIS K0070-3 (1992), respectively.

The glass transition temperature is the midpoint glass transition temperature of a polymer measured by a differential scanning calorimetry (DSC) method. The glass transition temperature is also called Tg.

The softening temperature is a value measured in accordance with the method of JIS K 7196 (1991).

The number average molecular weight is a value measured by gel permeation chromatography using polystyrene as a standard substance. The number average molecular weight is also called Mn.

In the present invention, the SP value (dissolution parameter) is a value calculated by the Fedros method (reference: R. F. Fedors, Polym. Eng. Sci., 14[2]147 (1974).

The film thickness is a value measured using a film thickness meter. In the examples, an eddy current type film thickness meter (trade name "EDY-5000", manufactured by Sanko Denshi Co., Ltd.) was used.

The average particle diameter of the powder particles contained in the powder coating material is a value obtained by calculating the volume average from the particle size distribution measured using a known particle size distribution measuring device using a laser diffraction method as a measurement principle. In the examples, a trade name "Helos-Rodos" (manufactured by Sympatec) was used.

Hereinafter, the embodiments for carrying out the present invention will be described. In each drawing, the same or corresponding components may be denoted by the same or corresponding reference numerals, and description thereof may be omitted. Moreover, the present invention is not limited to the following embodiments.

The present embodiment is a method of producing a powder coating material containing a fluororesin and a non-fluororesin, which includes kneading a raw material containing the fluororesin and the non-fluororesin using a kneading extruder equipped with a screw having a kneading zone, wherein a ratio of a length $L_K$ of the kneading zone to an effective length $L_S$ of the screw ($L_K/L_S \times 100$) is 21.0 to 50.0%.

Hereinafter, first, a powder coating material containing a fluororesin and a non-fluororesin (hereinafter, also referred to as "a hybrid powder coating material") will be described below. In the present specification, the non-fluororesin means a resin other than the fluorine resin, that is, a resin containing no fluorine atom. Further, in the present specification, the fluororesin and the non-fluororesin can be melt and are solid at room temperature.

When a hybrid powder coating material is used, one coat of powder coating is applied to the surface to be coated by an electrostatic coating method or the like to form a coating film, and the resulting coating film is heated, melted, and cured to form a cured film. At that time, when the difference in SP value (dissolution parameter) between the fluororesin and the non-fluororesin and the difference in surface free energy are adjusted, the fluororesin and the non-fluororesin tend to segregate vertically in the cured film. At this time, specifically, the resin forming the cured film is divided into an upper layer (a layer on the air side) containing a fluororesin as a main component and a lower layer (a layer on the coated surface side) containing a non-fluororesin as a main component. In this specification, such a characteristic is referred to as a layer separation property.

Thus, when the cured film is separated into layers and the fluororesin segregates in the upper layer, the cured film has excellent weather resistance. Further, in the hybrid powder coating material, because the ratio of the fluororesin contained in the coating material can be reduced, the cost of the powder coating material can also be reduced.

The hybrid powder coating material can be produced by melt-kneading a raw material containing a fluororesin and a non-fluororesin in a kneading extruder to obtain a kneaded product, and by pulverizing the resulting kneaded product. However, the present inventors have found that, depending on the kneading conditions in the kneading extruder, the produced powder coating material may not exhibit the above-described layer separation property. That is, when the cured film is observed in across section, a clear interface may not be formed between the upper and lower layers, or the continuity of the upper layer containing a fluororesin as a main component in the horizontal direction on the surface of the cured film may decrease. Therefore, the weather resistance of the resulting cured film may be deteriorated.

In contrast, in the screw of the kneading extruder, the present inventors found that a powder coating material capable of forming a cured film in which an upper layer containing a fluororesin (more specifically, an upper layer containing a fluororesin as a main component) and a lower layer containing a non-fluororesin (a lower layer containing a non-fluororesin as a main component) are layer-separated, and the fluororesin is formed as a continuous upper layer in the horizontal direction on the surface of the cured film, by adjusting the ratio of the length of the kneading zone having a kneading function ($L_K$ described later) with respect to the length of the portion through which the resin passes ($L_S$ described later) within the predetermined range.

The reason for this is not clear, but it is considered as follows. The fluororesin may be locally thickened under the influence of heat and pressure during melt-kneading in the kneading extruder, and the fluidity of the fluororesin and the entire raw material containing the fluororesin may decrease.

In response to this, when the kneading time is shortened to reduce the influence of heat due to melt-kneading, the raw materials are not sufficiently mixed, and the fluororesin is not uniformly dispersed in the raw materials. As a result, the continuity of the upper layer containing the fluororesin as a main component in the horizontal direction to the cured film surface may decrease.

However, in the production method of the present embodiment, because the conditions of the screw of the kneading extruder are suitable, the local thickening of the fluororesin as described above can be suppressed and the raw materials can be sufficiently mixed. Therefore, when the powder coating material produced by the production method of the present embodiment is used, the upper layer containing the fluororesin as the main component and the lower layer containing the non-fluororesin as the main component are layer-separated, and a cured film in which a continuous upper layer mainly containing the fluororesin is formed in the horizontal direction on the surface of the cured film can be obtained. As a result, the weather resistance of the cured film can be improved. Furthermore, the resulting cured film has excellent mechanical strength (e.g., hardness of the cured film surface, impact resistance, bending resistance, etc.) and excellent visual characteristics of the cured film surface (e.g., surface smoothness, specular glossiness, etc.).

Hereinafter, a layer containing a fluororesin as a main component is referred to as a fluororesin layer, and a layer containing a non-fluororesin as a main component is referred to as a non-fluororesin layer. Specifically, the cured film in which layer-separated, for example, the area of the non-fluororesin layer in the uppermost fluororesin layer is 10% or less in the cross section obtained by observing the cured film with a scanning electron microscope described later. In this state, it can be said that the fluororesin layer and the non-fluororesin layer are separated from each other, and a clear interface between the fluororesin layer and the non-fluororesin layer may be visually observed. Further, when viewed in a cross section obtained by observing the cured film with a scanning electron microscope described later, in the position of the uppermost surface of the cured film, it can be said that the fluororesin is formed as a continuous upper layer in the horizontal direction of the cured film surface, when the entire proportion of the fluororesin with respect to the entire cured film is 85% or more and preferably 90% or more. Moreover, when viewed from the above of the cured film with a scanning electron microscope, it can be said that the fluororesin is formed as a continuous upper layer in the horizontal direction of the cured film surface, when the surface area of the fluororesin with respect to the entire surface area of the cured film is 85% or more and preferably 90% or more.

FIG. 1 shows a schematic view of a kneading extruder 10 for carrying out the production method according to an embodiment of the present invention. The kneading extruder 10 includes a barrel (cylinder) 1 having a cylindrical shape, and also includes a screw 2 arranged in the barrel 1 and rotatable by power from a motor unit 6. The illustrated kneading extruder 10 is a twin-screw kneading extruder in which two screws 2 are horizontally provided. The rotation system of the twin-screw kneading extruder may be the rotation type which rotates in the same direction or the rotation type which rotates in the reverse direction. However, the rotation type which rotates in the same direction is preferably used. The kneading extruder may be a multi-screw extruder having three or more screws or a single-screw extruder having one screw 2.

The illustrated kneading extruder 10 is provided with a supply unit 3 that supplies a raw material mainly containing a resin into the barrel 1 on one end side of the barrel 1, and a die 5 for the other end side. The raw material is introduced from the supply unit 3 and melted and kneaded in the barrel 1 while being transferred in the axial direction of the screw 2 to form a kneaded product. The kneaded material reaching the die 5 is extruded through the die 5. The die 5 may be provided with a cutter or the like, and in this case, the kneaded material can be extruded as a solid pellet.

The kneading extruder may not include the die 5 and may include a roll instead of the die 5. When the kneading extruder is not equipped with the die 5, the kneaded material formed in the barrel 1 is directly extruded after reaching the tip portion of the screw 2. When the kneading extruder has a roll instead of the die 5, the kneaded product formed in the barrel 1 can be extruded as a plate-shaped solid through the roll. In FIG. 1, the arrow indicates the direction in which the raw material is transferred and extruded.

Both the barrel 1 and the shaft of the screw 2 may be provided with heating device, or either one may be provided with heating device. By such heating device, the melting of the charged resin can be promoted. The heating temperature by the heating device may be different in each zone described later. Further, the barrel 1 may be provided with a vent port or the like as necessary.

FIG. 2 shows a schematic view of the screw 2 used in the kneading extruder 10 of FIG. 1 as seen from the side. In the kneading extruder 10 according to the present embodiment, two screws 2 as shown in FIG. 2 are arranged in the barrel 1. In FIG. 2, the right side of the screw 2 is arranged on the side of the supply unit 3 (upstream side) of the kneading extruder 10, and the left side of the screw 2 is arranged on the side of the die 5 (downstream side).

In the illustrated form, the diameter (outer diameter) $D_S$ of the screw 2 is constant. $D_S$ does not necessarily have to be constant, but it is preferably constant from the viewpoint of the transportability of the raw material. Further, in the illustrated form, the groove depth of the screw 2 is constant. The groove depth does not have to be constant, and for example, a screw whose groove depth increases toward the die 5 or toward the supply unit 3 can be used. Generally, a screw having a deep groove depth on the side of supply unit 3 and a shallow groove depth on the side of die 5 is used.

The illustrated screw 2 has a transport zone 21 and a kneading zone 22. The transport zone 21 may be a zone from a raw material feeding position to a predetermined downstream position in the screw 2, and the transport zone 21 mainly has a function of transporting the resin to the downstream side. In the illustrated form, the number of each of the transport zone 21 and the kneading zone 22 is one, but the number of at least one of each zone may be plural. In that case, the transport zone 21 and the kneading zone 22 can be arranged alternately. Further, a metering zone 23 may be provided downstream of the kneading zone 22, as shown in FIG. 2. The metering zone 23 has a function of extruding the kneaded material in a constant amount.

The transport zone 21 may have one or more transport segments 41 provided with spiral flights. Due to such a spiral flight, the resin is extruded downstream and transported every time the screw 2 rotates in the transport zone 21.

The kneading zone 22 is provided downstream of the transport zone 21 and mainly has a function of melting and kneading the raw materials. The kneading zone 22 may be a zone from the downstream end of the transport zone 21 to the screw tip or to a position separated by a predetermined distance from the screw tip. The kneading zone 22 may have one or more kneading segments 42. The kneading segment 42 may be a segment, rotor, or the like with one or more kneading discs.

The kneading zone 22 may further include a neutral zone 24 and a non-neutral zone 25. In the illustrated form, the non-neutral zone 25 is provided adjacent to the transport zone 21, and the neutral zone 24 is provided adjacent to the non-neutral zone 25. Each of the neutral zone 24 and the non-neutral zone 25 has one or more kneading segments 42, but the configurations of the segments are different from each other. The neutral zone 24 has one or more neutral kneading segments (neutral segments) 44, and the non-neutral zone 25 has one or more non-neutral kneading segments (non-neutral segments) 45.

Both the neutral segment 44 and the non-neutral segment 45 are provided with a plurality of kneading discs (kneading discs), and these kneading discs are arranged so as to be offset from each other when viewed in a plane orthogonal to the axial direction of the screw 2. However, in the neutral segment 44 and the non-neutral segment 45, the angles at which the adjacent kneading discs are displaced are different, and therefore the functions of the two are also different.

Figure 3A:
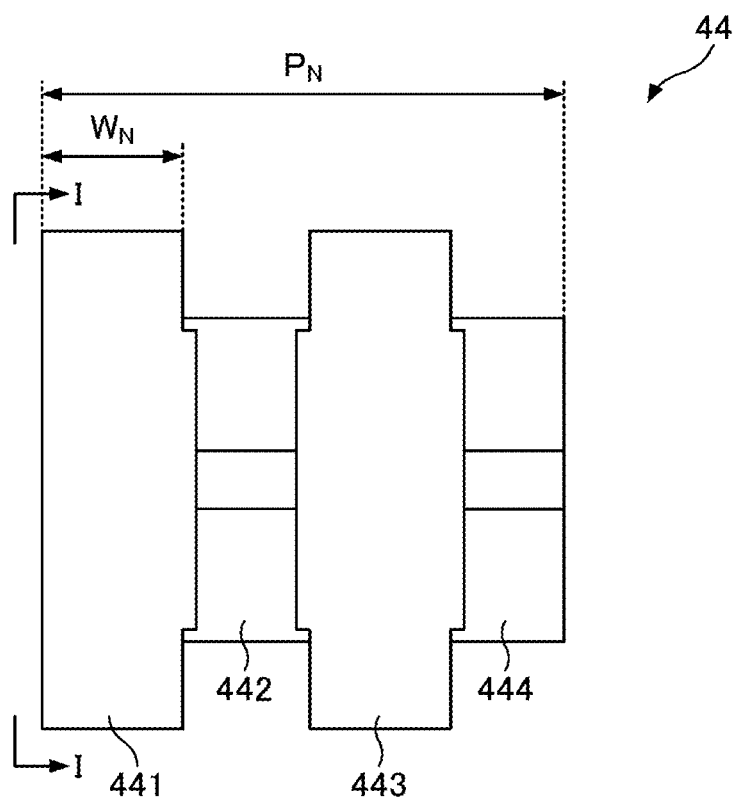
FIG. 3A is a figure which shows a neutral kneading segment used with the screw of the kneading extruder used in one embodiment of the present invention.
Figure 3B:
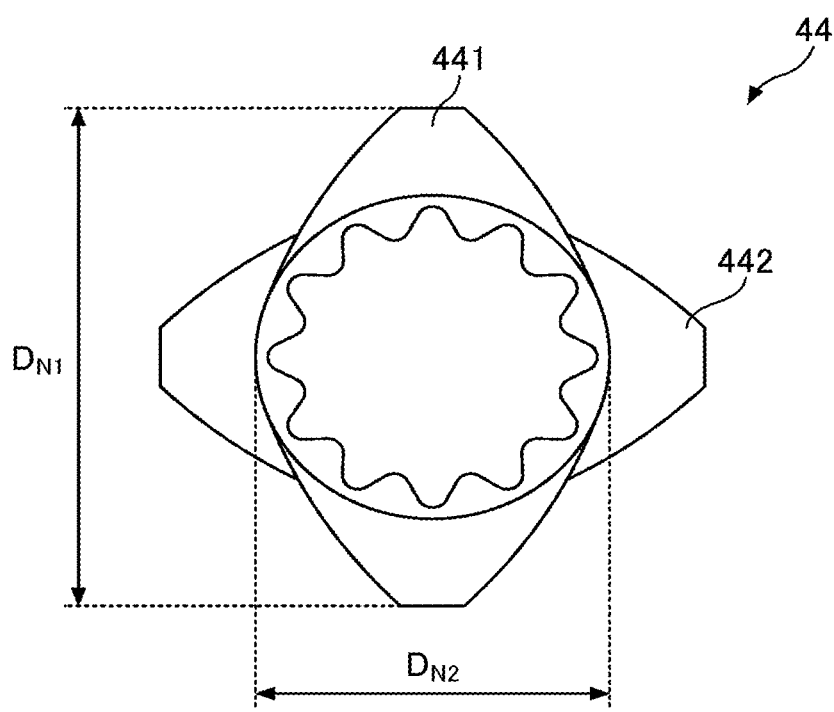
FIG. 3B is a figure which shows a neutral kneading segment used with the screw of the kneading extruder used in one embodiment of the present invention.

FIG. 3 schematically shows an example of the neutral segment 44. FIG. 3A shows a side view of the neutral segment 44, and FIG. 3B shows an end view of the neutral segment 44 when the segment 44 of FIG. 3A is viewed in a direction indicated by an arrow I-I. In the illustrated form, the neutral segment 44 has a plurality of kneading discs (kneading discs) 441, 442, 443, and 444. Each kneading disc has the same substantially elliptical shape when viewed in a plane orthogonal to the axial direction of the screw 2. Adjacent kneading discs, for examples, kneading discs 441 and 442, are arranged offset from each other. Specifically, the direction of the major axis of the kneading disc 441 and the direction of the major axis of the kneading disc 442 are arranged so as to be orthogonal to each other. With such a configuration, the neutral segment has a high kneading function and has almost no transporting function.

The major axis $D_{N1}$ of the neutral segment 44 used in the production method of the present embodiment is preferably 10 to 200 mm and more preferably 15 to 150 mm. Further, the minor axis $D_{N2}$ of the neutral segment 44 is preferably 5 to 180 mm and more preferably 10 to 130 mm.

When at least one of the major axis and the minor axis of each disc is different, the major axis $D_{N1}$ and the minor axis $D_{N2}$ of the neutral segment 44 can be the average value of all the discs in the neutral segment.

The axial length $P_N$ (pitch) of one neutral segment 44 is preferably 10 to 200 mm and more preferably 15 to 150 mm. When the neutral zone 24 includes a plurality of neutral segments and the lengths of the segments are different from each other, the length $P_N$ of one neutral segment 44 can be the average value of all the neutral segments in the neutral zone.

The width $W_N$ (length in the axial direction of the screw 2) of one disc included in the neutral segment 44 is preferably 2.5 to 50 mm and more preferably 4 to 40 mm. If the discs have different widths, the width of disc can be the average of all discs in the neutral segment.

The number, shape, size, or the like of the kneading discs contained in one neutral segment 44 can be appropriately designed to obtain a desired kneading state. For example, the number of kneading discs included in one neutral segment 44 can be set to 2 to 6, and the shape of the kneading discs viewed in a plane orthogonal to the axial direction of the screw 2 can be circular, triangular, or oval. Further, the number of neutral kneading segments 44 provided in the kneading extruder 10 is preferably 2 to 6, and more preferably 3 to 4.

The non-neutral segment 45 is a kneading segment having a kneading function, but also has a transporting function. As the non-neutral segment 45, a forward feed type screw capable of feeding a material downstream by rotating the screw and a reverse feed type screw capable of feeding a material upstream by rotating the screw are known. As the non-neutral segment 45 in the present embodiment, a segment of forward feed type screw is preferably used from the viewpoint of controlling the thickening of the raw material during melt-kneading.

The non-neutral segment 45 may also include multiple discs per one segment in the same manner as the neutral segment 44. As the non-neutral segment 45, in this embodiment, two types of segments 45A and 45B that are different in the angle at which adjacent discs are displaced are used (FIG. 2).

Figure 4A:
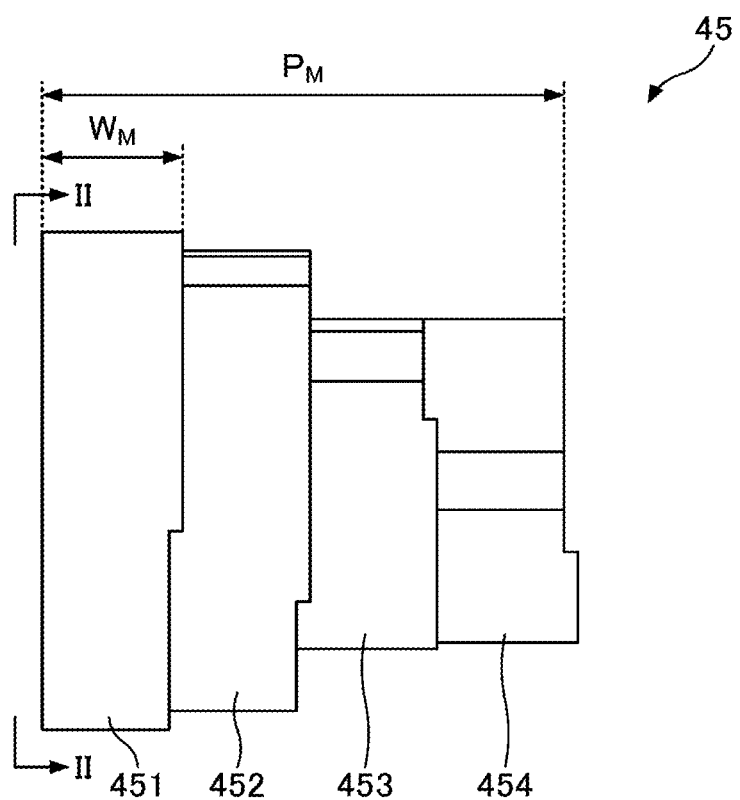
FIG. 4A is a figure which shows a non-neutral kneading segment used with the screw of the kneading extruder used in one embodiment of the present invention.
Figure 4B:
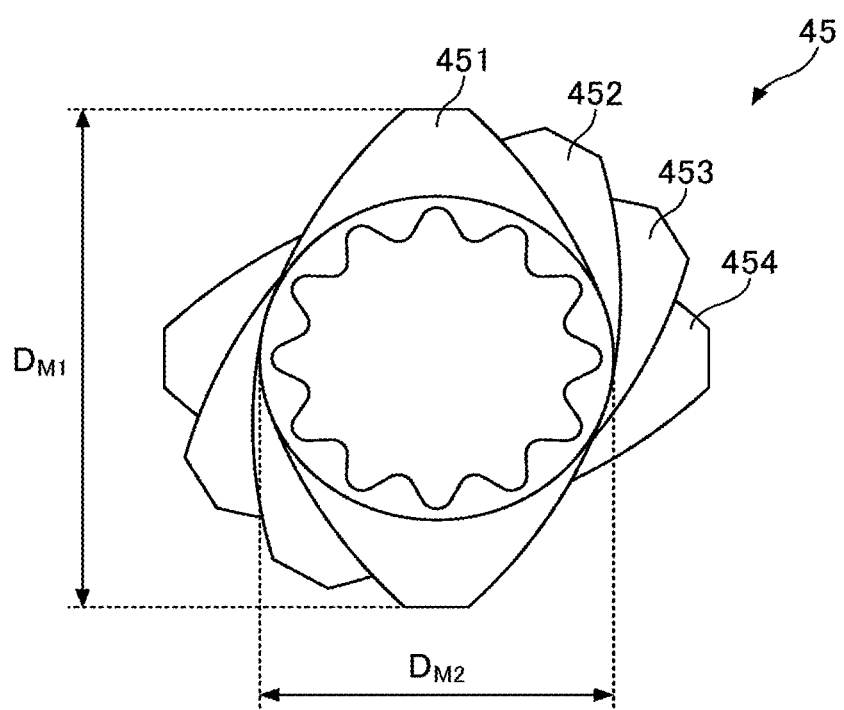
FIG. 4B is a figure which shows a non-neutral kneading segment used with the screw of the kneading extruder used in one embodiment of the present invention.

FIG. 4 schematically shows an example of the non-neutral segment 45A. FIG. 4A shows a side view of the non-neutral segment 45A, and FIG. 4B shows an end view of the non-neutral segment 45A as seen in the direction of arrow II-II of the segment 45A of FIG. 4A. In the illustrated form, the non-neutral segment 45A has four kneading discs (kneading discs) 451, 452, 453, and 454. Each disc has the same substantially elliptical shape when viewed in a plane orthogonal to the axial direction of the screw 2. Similar to the neutral segment 44 described above, the adjacent discs in the non-neutral segment 45A are arranged so as to be offset from each other by a predetermined angle. In the illustrated example, the directions of major axes of the adjacent kneading discs are arranged so as to be offset by 300.

The non-neutral segment 45B differs from the non-neutral segment 45A in that the adjacent discs are offset by 60°. Therefore, the non-neutral segment 45B has a higher kneading function and a lower transporting function than the non-neutral segment 45A.

The major axis $D_{M1}$ of each of the non-neutral segments 45A and 45B is preferably 10 to 200 mm and more preferably 15 to 150 mm. The minor axis $D_{M2}$ is preferably 5 to 180 mm and more preferably 10 to 130 mm. When at least one of the major axis and the minor axis of each disc is different, the major axis $D_{M1}$ and the minor axis $D_{M2}$ of the non-neutral segment 45 can be the average value of all the discs in the non-neutral segment.

In each of the non-neutral segments 45A and 45B, the axial length $P_M$ (pitch) of one segment is preferably 10 to 200 mm and more preferably 15 to 150 mm. When each of the non-neutral segments 45A and 45B has a plurality of segments and the lengths of the segments are different from each other, the length $P_M$ of one segment 45 is the average value of all the segments in the non-neutral zone.

The width $W_M$ (length in the axial direction of the screw 2) of one disc included in the non-neutral segment 45 is preferably 2.5 to 50 mm and more preferably 4 to 40 mm. When each disc has different widths, the disc width can be the average value of all discs in the non-neutral segment.

The number, shape, size, or the like of the kneading discs included in one non-neutral segment 45 can be appropriately designed to obtain a desired kneading state. For example, the number of kneading discs included in one non-neutral segment 45 can be set to 2 to 6, and the shape of the kneading discs seen in a plane orthogonal to the axial direction of the screw 2 can be circular, triangular, or elliptical. The angle at which the adjacent kneading discs are displaced can be appropriately selected from 15 to 75° depending on the desired kneading function and transporting function.

In the illustrated form, there is one neutral zone 24 and one non-neutral zone 25, but a plurality of zone may be provided. In that case, the neutral zones 24 and the non-neutral zones 25 can be arranged alternately. However, the zone adjacent to the transport zone 21 is preferably the non-neutral zone 25 having a transport function from the viewpoint of smoothly transporting the material. Further, when using two or more kinds of non-neutral segments having different transport functions, the non-neutral segment having a high transport function is preferably placed at closer to the transport zone. The number of non-neutral kneading segments 45 provided in the kneading extruder 10 is preferably 0 to 3.

The lengths of the kneading zone 22, the neutral zone 24, and the non-neutral zone 24 described above are $L_K$, $L_N$ and $L_R$ (FIG. 2), respectively. When a plurality of kneading zones is present, $L_K$ is the total length of all kneading zones. Similarly, $L_N$ is the sum of all neutral zones and $L_R$ is the sum of all non-neutral zones. In addition, the total length of all the transport zones 21, the kneading zones 22, and the measuring zones 23 of the screw 2 is defined as the effective length of the screw and is represented by $L_S$. The effective length $L_S$ of the screw 2 can be appropriately selected depending on the $D_S$ of the screw 2, but is preferably 12 to 560 cm and more preferably 15 to 500 cm.

In this embodiment, the K value ($L_K/L_S \times 100$), which is the ratio of the length $L_K$ of the kneading zone 22 to the effective length $L_S$ of the screw, is 21.0 to 50.0%. The K value is preferably 23.0 to 45.0%, more preferably 25.0 to 40.0%, and particularly preferably 35.0 to 40.0%.

If the K value is 21.0% or higher, the fluororesin and the non-fluororesin can be well dispersed during the melt-kneading. If the K value is 50.0% or less, excessive kneading in the kneading extruder can be prevented, and the fluororesin can be prevented from thickening. As a result, excellent layer separation property of the resulting cured film can be obtained. That is, in the cured film, the fluororesin layer is arranged in the upper layer and the non-fluororesin layer is arranged in the lower layer, and a clear interface is observed between the fluororesin layer and the non-fluororesin layer, and high continuity of the upper layer in the horizontal direction with respect to the surface of the cured film can be obtained. For example, when the cross section of the cured film is observed using two types of scanning electron microscopes described later, the ratio of the area of the fluororesin layer to the area of the entire surface of the cured film can be 85% or more, preferably 90% or more, and more preferably 95% or more.

The N value ($L_N/L_K \times 100$), which is the ratio of the length $L_N$ of the neutral zone 24 to the length $L_K$ of the kneading zone 22, can be 30% or more. The N value is preferably 30 to 100%, more preferably 40 to 90%, particularly preferably 50 to 70%, and further preferably 60 to 65%. By adjusting the N value to 30% or more, it is possible to improve the dispersion of the fluororesin and the non-fluororesin in the raw material. Further, when the K value is 21.0 to 50.0% and the N value is 30% or more, it is possible to improve the dispersion of the fluororesin and the non-fluororesin in the melt-kneading while controlling the thickening of the fluororesin.

When the K value is 21.0 to 50.0%, there is no particular upper limit to the N value, and the length $L_K$ of the kneading zone 22 is equal to the length $L_N$ of the neutral zone 24. That is, the kneading zone 22 may be formed of a neutral segment. However, from the viewpoint of smoothly transporting the material from the transport zone 21 to the kneading zone 22, the kneading zone 22 has a kneading zone having a transporting function such as a non-neutral zone 25 at the end portion adjacent to the transport zone 21 is preferably provided.

The ratio of the length $L_N$ of the neutral zone 24 to the effective length $L_S$ of the screw ($L_N/L_S \times 100$) is preferably 6 to 50% and more preferably 21 to 50%.

The value of the ratio ($L_S/D_S$) of the effective length $L_S$ of the screw to the diameter $D_S$ (outer diameter) of the screw 2 is preferably 10 to 30 and more preferably 12 to 28. By adjusting the value of $L_S/D_S$ to 10 or more, the raw materials can be appropriately mixed, and the fluororesin can be uniformly dispersed in the resulting powder coating material. Further, by adjusting the value of $L_S/D_S$ to 30 or less, excessive kneading of the resin can be prevented.

In the kneading step in the production method according to the present embodiment, the rotational speed of the screw 2 is not largely affected, but the speed can be set to 10 to 1,000 rpm and preferably 200 to 600 rpm. According to this embodiment, in a wide range of rotation speeds as described above, excessive kneading of the resin can be prevented, the reduction of the fluidity of the fluororesin can be prevented, and also, the raw material can be sufficiently mixed.

The kneading temperature in the kneading step is preferably at above either a glass transition temperature of the fluororesin or a glass transition temperature of the non-fluororesin, and the raw material is kneaded at below a temperature at which curing initiates. Here, the temperature at which curing of the raw material initiates refers to a lower temperature of either the curing initial temperature of the fluororesin or the curing initial temperature of the non-fluororesin. When the raw material contains a curing agent, the kneading temperature is the lower temperature of the curing initial temperature of the compound of the fluororesin and the curing agent or the curing initial temperature of the compound of the non-fluororesin and the curing agent. By adjusting the kneading temperature as described above, it is possible to uniformly mix the resins with each other while preventing the raw materials from hardening in the kneading extruder and hindering the kneading. The kneading temperature is preferably 100° C. or above, more preferably 110° C. or above, from the viewpoint that uniform mixing can be performed while controlling the thickening of the raw materials during melt-kneading. Further, from the viewpoint of uniformly mixing the raw materials during the melt-kneading process and preventing the raw materials from hardening in the kneading extruder and hindering the kneading, the temperature is preferably 300° C. or below and more preferably 190° C. or below. The kneading temperature is preferably 100 to 300° C. and more preferably 110 to 190° C.

The powder coating material produced according to the present embodiment is a hybrid powder coating material containing a fluororesin and a non-fluororesin. In the production of powder coating materials, a fluororesin, a non-fluororesin, and, if necessary, other components such as a curing agent and a pigment are input into to a kneading extruder and melt-kneaded. The resulting kneaded product is cooled, as needed, and pulverized to obtain a powder coating material. In addition, a curing agent and other components may be added after crushing the resulting kneaded product.

The fluororesin used as a raw material is preferably a fluoropolymer containing units based on fluoroolefin. Fluoroolefins are olefins in which one or more hydrogen atoms have been replaced by fluorine atoms. The carbon number of the fluoroolefin is preferably 2 to 8 and more preferably 2 to 6. The number of fluorine atoms in the fluoroolefin is preferably 2 or more and more preferably 3 to 4. When the number of fluorine atoms is 2 or more, the cured film exhibits improved weather resistance. In the fluoroolefin, one or more hydrogen atoms which are not replaced by fluorine atoms may be replaced by chlorine atoms.

Specific examples of the fluoroolefin include $CF_2=CF_2$, $CF_2=CFCl$, $CF_2=CHF$, $CH_2=CF_2$, $CF_2=CFCF_3$, $CF_2=CHCF_3$, $CF_3CH=CHF$, and $CF_3CF=CH_2$. From the viewpoint of copolymerization, $CF_2=CFCl$, $CF_3CH=CHF$ or $CF_3CF=CH_2$ is preferably used. Two or more fluoroolefins may be used in combination.

The fluoropolymer may include only units based on a fluoroolefin, may include units based on monomers containing a fluorine atom other than the fluoroolefin, or may include units based on monomers that does not include a fluorine atom.

Examples of the fluoropolymer containing only units based on fluoroolefin include homopolymers of fluoroolefins and copolymers of two or more fluoroolefins. Specific examples thereof include polytetrafluoroethylene, polychlorotrifluoroethylene, a copolymer of tetrafluoroethylene and hexafluoropropylene, and polyvinylidene fluoride.

A fluoroolefin-perfluoro (alkyl vinyl ether) copolymer is mentioned as a fluoropolymer containing units based on monomers containing a fluorine atom other than a fluoroolefin. Specifically, a tetrafluoroethylene-perfluoro (alkyl vinyl ether) copolymer may be mentioned.

The content of the units based on fluoroolefin with respect to the entire units included in the fluoropolymer is preferably 5 to 100 mol %, more preferably 20 to 70 mol %, and particularly preferably 40 to 60 mol %.

The production method according to the present embodiment is particularly effective when a fluoropolymer containing units based on monomers not containing a fluorine atom is used because the thickening during melt-kneading can be controlled more effectively.

When the fluoropolymer includes units based on monomers that do not contain a fluorine atom, this unit preferably includes units having a crosslinkable group. The units having a crosslinkable group may be units based on monomers having a crosslinkable group, and may be units obtained by converting the crosslinkable group in the fluoropolymer having a crosslinkable group into a different crosslinkable group. In this case, when a curing agent is included as a raw material, the crosslinking group serves as a crosslinking point, and the crosslinking reaction between the fluoropolymers is promoted by the curing agent to improve the physical properties of the cured film. Examples of the crosslinkable group include a hydroxyl group, a carboxy group, an amino group, an alkoxysilyl group, or an epoxy group. From the viewpoint of water resistance, chemical resistance, and impact resistance of the cured film, a hydroxyl group or a carboxy group is preferably used and a hydroxyl group is more preferably used.

Examples of the monomers having a crosslinkable group include a carboxylic acid which is capable of polymerizing with vinyl alcohol and fluoroolefin. Also, examples of the monomer having a crosslinkable group include vinyl ether, vinyl ester, allyl ether, allyl ester, acrylate ester, and methacrylate ester. Specifically, a compound represented by the formula such as $CH_2$=CHCOOH, $CH(CH_3)$=CHCOOH, $CH_2$=C($CH_3$) COOH, $CH_2$=CH($CH_2$)$_{n2}$COOH (where n2 is an integer of 1 to 10), $CH_2$=CHO—$CH_2$-cyclo$C_6H_{10}$—$CH_2$OH, $CH_2$=CHCH$_2$O—$CH_2$-cyclo$C_6H_{10}$—$CH_2$OH, $CH_2$=CHOCH$_2$CH$_2$OH, $CH_2$=CHCH$_2$OCH$_2$CH$_2$OH, $CH_2$=CHOCH$_2$CH$_2$CH$_2$CH$_2$OH, $CH_2$=CHCH$_2$OCH$_2$CH$_2$CH$_2$OH, $CH_2$=CHCOOCH$_2$CH$_2$OH, $CH_2$=C($CH_3$) COOCH$_2$CH$_2$OH. In addition, "-cyclo$C_6H_{10}$—" represents a cyclohexylene group, and the binding site of "-cyclo$C_6H_{10}$—" is usually "1,4-".

Two or more kinds of monomers having a crosslinkable group may be used in combination.

From the viewpoint of excellent physical properties of the cured film, the content of the units based on the monomers having a crosslinkable group with respect to all units contained in the fluoropolymer is preferably 0.5 to 35 mol %, more preferably 3 to 30 mol %, particularly preferably 5 to 25 mol %, and most preferably 5 to 20 mol %.

The fluoropolymer may contain units based on monomers containing no fluorine atom and no crosslinkable group. Examples of the units include alkenes, vinyl ethers, vinyl esters, allyl ethers, allyl esters, acrylate esters, methacrylate esters and the like. Specific examples include ethylene, propylene, ethyl vinyl ether, 2-ethylhexyl vinyl ether, vinyl acetate, vinyl benzoate, methyl acrylate, methyl methacrylate, butyl acrylate, and butyl methacrylate.

Among them, the fluoropolymer preferably contains units based on monomers having an alkyl group having a tertiary carbon atom having 3 to 9 carbon atoms or a cycloalkyl group having 4 to 10 carbon atoms in the side chain from the view point of Tg of the fluoropolymer.

However, this unit does not contain a fluorine atom and a crosslinkable group.

Examples of the alkyl group having a tertiary carbon atom having 3 to 9 carbon atoms and the cycloalkyl group having 4 to 10 carbon atoms include tert-butyl group, neononyl group, cyclohexyl group, cyclohexylmethyl group, 4-cyclohexylcyclohexyl group, 1-decahydronaphthyl group, and the like.

Specific examples of the above units include cyclohexyl vinyl ether, tert-butyl vinyl ether, vinyl pivalate, tert-butyl vinyl benzoate, and vinyl neononanoate. Two or more kinds of the above units may be used in combination.

From the viewpoint of Tg of the fluoropolymer and flexibility of the cured film, the content of the units based on the monomers containing no fluorine atom and no crosslinkable group with respect to all units contained in the fluoropolymer is preferably 5 to 60 mol % and more preferably 10 to 50 mol %.

The fluoropolymer preferably contains 20 to 70 mol % of units based on a fluoroolefin, 0.5 to 35 mol % of units based on monomers having a crosslinkable group, 5 to 60 mol % of units based on monomers not having crosslinkable group with no fluorine atom, with respect to the all the units of the fluoropolymer.

From the viewpoint of water resistance and smoothness of the cured film, Mn of the fluoropolymer is preferably 3,000 to 50,000 and more preferably 5,000 to 30,000.

The hydroxyl value of the fluoropolymer is preferably 5 to 200 mgKOH/g and more preferably 10 to 150 mgKOH/g, from the viewpoint of adhesion between the fluororesin layer and the non-fluororesin layer.

The acid value of the fluoropolymer is preferably 1 to 150 mgKOH/g, more preferably 3 to 100 mgKOH/g, and particularly preferably 5 to 50 mgKOH/g from the viewpoint of adhesion between the fluororesin layer and the non-fluororesin layer.

The fluoropolymer may have only one of the acid value and the hydroxyl value, or may have both. If the total of the acid value and the hydroxyl value is within the above range, the Tg of the fluoropolymer can be appropriately adjusted and the cured film will have excellent physical properties.

The melting point of the fluororesin is preferably 300° C. or lower, more preferably 200° C. or lower, and particularly preferably 180° C. or lower. From the viewpoint of blocking resistance of the powder coating material and smoothness of the cured film, the Tg of the fluororesin is preferably 30 to 150° C., more preferably 40 to 120° C., and even more preferably 50 to 100° C.

From the viewpoint of layer separation property of the cured film, the SP value of the fluororesin is preferably 16.0 to 20.0 $(J/cm^3)^{1/2}$, more preferably 16.5 to 19.5 $(J/cm^3)^{1/2}$, and particularly preferably 17.0 to 19.0 $(J/cm^3)^{1/2}$.

As the non-fluororesin used in the production method of the present embodiment, those having low compatibility with the fluororesin are preferably used. For example, the non-fluororesin in which the difference between the SP value of the fluororesin and the SP value of the non-fluororesin used is 0.6 $(J/cm^3)^{12}$ or more is preferably used. Examples of the non-fluororesin include polyester resin, acrylic resin, epoxy resin, polyethylene resin, and urethane resin. Of these, from the viewpoint of the balance between weather resistance and cost, polyester resin or acrylic resin is preferably used, and polyester resin is more preferably used. Two or more kinds of these resins may be used in combination.

When the polyester resin is included as the non-fluororesin, the resin includes a structure in which the units based on the polyvalent carboxylic acid compound and the units based on the polyhydric alcohol compound are linked by an ester bond. The polyester resin may contain units based on a hydroxycarboxylic acid as units other than the carboxylic acid units and the alcohol units.

As the polyester resin, for example, a polymer having units derived from an aromatic polycarboxylic acid compound having 8 to 15 carbon atoms and units derived from a polyhydric alcohol compound having 2 to 10 carbon atoms can be used.

The hydroxyl value of the polyester resin is preferably 20 to 100 mgKOH/g and more preferably 30 to 80 mgKOH/g. The acid value of the polyester resin is preferably 1 to 80 mgKOH/g and more preferably 3 to 50 mgKOH/g.

From the view point of melt viscosity of powder coatings, the Mn and Mw of the polyester resin are preferably Mn of 5,000 or less and Mw of 6,000 to 20,000; and more preferably Mn of 5,000 or less and Mw of 6,000 to 10,000.

Specific examples of the polyester resin include "CRYL-COAT (registered trademark) 4642-3" and "CRYLCOAT (registered trademark) 4890-0" manufactured by Nippon Cytec Industries Co., Ltd.; and "GV-250", "GV-740", and "GV-175" manufactured by Japan U-Pica Company Ltd.

The (meth)acrylic resin is a resin composed of a polymer having units based on an alkyl(meth)acrylate, and a copolymer further having units based on monomers having a second crosslinkable group is preferably used.

Examples of the alkyl(meth)acrylate include alkyl methacrylate (methyl methacrylate, butyl methacrylate, etc.) and alkyl acrylate (ethyl acrylate, etc.). Examples of the second cross linkable group-containing monomer include methacrylic acid, acrylic acid, hydroxyalkyl(meth)acrylate (hydroxyethyl methacrylate, etc.), and epoxy group-containing (meth)acrylate (glycidyl methacrylate, etc.). The (meth) acrylic resin may further have units based on monomers (styrene etc.) other than (meth)acrylate.

Specific examples of the acrylic resin include "FINEDIC (registered trademark) A-249", "FINEDIC (registered trademark) A-251", and "FINEDIC (registered trademark) A-266" manufactured by DIC Corporation; "ALMATEX (registered trademark) PD6200", "ALMATEX (registered trademark) PD7310" manufactured by Mitsui Chemicals Inc.; "SANPEX PA-55" manufactured by Sanyo Chemical Industries Ltd.

The epoxy resin is a compound having two or more epoxy groups in the molecule. The epoxy resin is preferably an aromatic compound having a glycidyloxy group such as bisphenol A-diglycidyl ether.

Specific examples of the epoxy resin include "EPIKOTE (registered trademark) 1001", "EPIKOTE (registered trademark) 1002", "EPIKOTE (registered trademark) 4004P" manufactured by Mitsubishi Chemical Corporation; "EPICLON (registered trademark) 1050", "EPICLON (registered trademark) 3050" manufactured by DIC Corporation; "Epotohto (registered trademark) YD-012", "Epotohto (registered trademark) YD-014" manufactured by Nippon Steel Chemical & Material Co., Ltd.; "DENACOL (registered trademark) EX-711" manufactured by Nagase ChemteX Corporation; and "EHPE3150" manufactured by Daicel Corporation.

The urethane resin is a mixture of polyol (acrylic polyol, polyester polyol, polyether polyol, propylene glycol, etc.) with an isocyanate compound, or a resin obtained by reacting this mixture. A mixture of powdered polyol (acrylic polyol, polyester polyol, polyether polyols) with powdered isocyanates is preferably used.

As a non-fluororesin, the state of the resin is solid at room temperature, the softening temperature is preferably 100 to 150° C., the Tg is preferably 30 to 60° C., and the melting point is preferably 200° C. or below.

The SP value of the non-fluororesin is preferably larger than the SP value of the fluororesin. Further, from the viewpoint of layer separation property of the cured film, the SP value of the non-fluororesin is preferably 18.0 to 30.0 $(J/cm^3)^{1/2}$, more preferably 18.5 to 29.5 $(J/cm^3)^{1/2}$, and particularly preferably 19.0 to 29.0 $(J/cm^3)^{1/2}$.

From the viewpoint of the layer separation property of the cured film, the difference in SP value between the fluororesin and the non-fluororesin may be 0.6 $(J/cm^3)^{12}$ or more, preferably 0.6 to 16 $(J/cm)^{1/2}$, and particularly preferably 2.0 to 10.0 $(J/cm^3)^{1/2}$.

The content of the fluororesin contained in the raw material of the powder coating material is preferably 5 to 95% by mass, more preferably 10 to 80% by mass, and particularly preferably 10 to 50% by mass, based on the total mass of the raw material. The mass ratio of the fluororesin to the non-fluororesin (mass of fluororesin/mass of non-fluororesin) contained in the raw material of the powder coating material is preferably 70/30 to 10/90 and more preferably 50/50 to 30/70. The total mass of the fluororesin and the non-fluororesin is 30 to 100% by mass, preferably 40 to 90% by mass, and more preferably 50 to 80% by mass, based on the total mass of the raw material or powder coating material.

With the powder coating material obtained by the production method of the present embodiment, even if the content of the fluororesin is low, a cured film can be formed in which the fluororesin layer is continuously formed in the horizontal direction on the surface of the cured film.

The raw material preferably contains a curing agent in addition to the fluororesin and the non-fluororesin. However, the curing agent may be added after kneading and pulverizing the fluororesin and the non-fluororesin without adding the curing agent at the time of adding raw materials. Further, if the fluororesin and the non-fluororesin can be cured by other methods such as electron beam crosslinking without using a curing agent, the curing agent may be omitted.

Conventional curing agents may be used. Examples of the curing agents include blocked isocyanate type curing agents, melamine resins, guanamine resins, sulfamide resins, urea resins, amine type curing agents such as aniline resins, @-hydroxyalkylamide curing agents, and triglycidyl isocyanurate curing agents. Two or more curing agents may be used in combination.

The softening temperature of the curing agent is preferably 10 to 120° C. and more preferably 40 to 100° C. By adjusting the softening temperature to 10° C. or higher, it is possible to prevent the powder coating material from hardening at room temperature and forming granular lumps. Further, when the temperature is 120° C. or below, the curing agent can be uniformly dispersed in the raw material in the kneading step, and the smoothness of the resulting cured film and the strength of the cured film can be improved.

The content of the curing agent is preferably 1 to 50% by mass and more preferably 3 to 30% by mass, based on the total mass of the raw material of the powder coating material.

The raw material used in the production method of the present embodiment may contain other components in addition to the above-mentioned fluororesin, non-fluororesin, and curing agent. Other components include pigments, curing catalysts, degassing agents, surface modifiers, ultraviolet absorbers, matting agents such as ultrafine synthetic silica, nonionic, cationic or anionic surfactants, leveling agents, filling agents, heat stabilizers, thickeners, dispersants, antistatic agents, rust preventives, silane coupling agents, antifouling agents, and treatment agents for reducing pollution.

As a pigment, at least one selected from the group consisting of bright pigments, rust preventive pigments, coloring pigments and extender pigments is preferably used. Examples of bright pigments include aluminum powder, nickel powder, stainless powder, copper powder, bronze powder, gold powder, silver powder, mica powder, graphite powder, glass flakes, and scaly iron oxide powder. As the rust-preventive pigment, a lead-free rust-preventive pigment having a low environmental load is preferably used, and examples thereof include cyanamide zinc, zinc oxide, zinc phosphate, calcium magnesium phosphate, zinc molybdate, barium borate, and cyanamide zinc calcium. The color pigment is a pigment for coloring the cured film. Examples of the color pigment include titanium oxide, carbon black, iron oxide, phthalocyanine blue, phthalocyanine green, quinacridone, isoindolinone, benzimidazolone, dioxazine, and the like. Examples of extender pigments include talc, barium sulfate, mica, calcium carbonate, and the like.

The content of the pigment in the powder coating material obtained by this embodiment is preferably 20 to 200 parts by mass and more preferably 50 to 150 parts by mass based on the 100 parts by mass of the fluororesin in the powder coating material.

The curing catalyst may be a tin catalyst such as tin octylate, tributyl tin dilaurate, and dibutyl tin dilaurate. Two or more curing catalysts may be used in combination.

The powder coating material produced by the production method of the present embodiment can be suitably used for coating metals such as aluminum, iron, and magnesium. According to the powder coating material produced by the present embodiment, the upper layer containing the fluororesin (more specifically, the upper layer containing the fluororesin as a main component) and the lower layer containing the non-fluororesin (the lower layer containing the non-fluororesin as the main component) are layer-separated and a cured film in which the upper layer containing a fluororesin (more specifically, an upper layer containing a fluororesin as a main component) is continuously formed in the horizontal direction on the surface of the cured film. As a result, the weather resistance of the cured film is improved, the cured film can be suitably used for applications where high weather resistance is required such as painted surfaces that are installed outdoors, for example, outdoor units for air conditioners placed near the coast, poles for traffic lights, signs, and the like.

After the kneading step in the method of producing a powder coating material of the present embodiment, the resulting kneaded product is cooled at 0° C. to 40° C. and pulverized by a pulverizer, such as a mill or a grinder, to obtain a powdered composition. Also, a powder coating material of the present invention can be obtained by mixing powdered components as needed. The kneaded product may be cooled rapidly or slowly. From the viewpoint of the surface smoothness of the cured film, the average particle size of the powder particles in the powder coating material obtained by pulverization may be 120 µm or less and preferably 90 µm or less.

Further, the coating methods of the powder coating material produced by the production method of the present embodiment include electrostatic coating, electrostatic spraying, electrostatic immersion, atomizing, fluidized immersion, spraying, thermal spraying, plasma spraying, and the like. The electrostatic coating method using a powder coating gun is preferably used in terms of excellent smoothness of the cured film and excellent hiding property of the cured film even when the cured film is made thin. Examples of powder coating guns include corona charging type coating guns and friction charging type coating guns. A fluidized immersion method is preferably used as a method for forming a cured film having a relatively thick film.

The powder coating material can be applied to a substrate to form a coating film composed of a melt of the powder coating material on the substrate. As a substrate, metals such as aluminum, iron and magnesium and alloys thereof are preferably used. The shape and size of the substrate are determined according to the application.

A coating film composed of a melt of the powder coating material may be formed at the same time as the coating of the powder coating material on the substrate. The coating film may be formed by applying the powdered coating material to the substrate followed by heating and melting the powder coating material on the substrate. When the powder coating material contains a curing agent, the crosslinking reaction of the reaction components in the composition starts at almost the same time when the powder coating material is heated and melted. Therefore, heating and melting of the powder coating material and the adhesion of the powder coating material on the substrate are preferably carried out at almost the same time, or adhering of the powder coating material on the substrate followed by heating and melting of powder coating material is preferably carried out.

A heating temperature in which heating and melting the powder coating material and a heat-retaining time for curing the molten state of the powder coating material in a predetermined time are suitably adjusted based on the type and composition of the raw material components of the powder coating material, and by the desired film thickness of the coating film. The heating temperature is adjusted according to the reaction temperature of the curing agent. When the curing agent is a blocked polyisocyanate, the heating temperature is usually 150 to 300° C. and preferably 170 to 220° C., and the heat-retaining temperature is usually 5 to 120 minutes.

The cured film formed by the powder coating material produced by the production method of the present embodiment may have a thickness of 40 to 1,000 µm, and preferably 50 to 100 µm. Since the powder coating material produced by the production method of the present embodiment ensures the fluidity of the fluororesin when the coating film is melted, good layer separation property in the film thickness within the above range can be obtained. As a result, the cured film having a high weather resistance can be obtained. Further, the cured film has excellent mechanical strength and visual characteristics.

In addition, one embodiment of the present invention is a powder coating material containing a fluororesin and a non-fluororesin. The powder coating material is produced by the method of producing a powder coating material includes a step of kneading a raw material containing the fluororesin and the non-fluororesin with a kneading extruder equipped with a screw having a kneading zone, wherein a ratio of a length $L_K$ of the kneading zone to an effective length $L_S$ of the screw ($L_K/L_S \times 100$) is 21.0 to 50.0%. A coating film having high weather resistance in which a fluororesin layer is continuously formed on the air side can be formed by using the powder coating material of the present embodiment.

Further, according to one embodiment of the present invention, the present invention provides a cured film obtained by using a kneading extruder quipped with a screw having a kneading zone wherein a ratio of a length $L_K$ of the kneading zone to an effective length $L_S$ of the screw ($L_K/L_S \times 100$) is 21.0 to 50.0%; obtaining a kneaded product by kneading a raw material containing a fluororesin and a non-fluororesin; obtaining a powder composition by pulverizing the kneaded product; forming a coating film by coating the powder coating material containing the powder composition on a surface to be coated; and curing the coating film.

In addition, according to one embodiment of the present invention, the present invention provides a cured film obtained by using a kneading extruder quipped with a screw having a kneading zone, wherein a ratio of a length $L_K$ of the kneading zone to an effective length $L_S$ of the screw ($L_K/L_S \times 100$) is 21.0 to 50.0%; obtaining a kneaded product by kneading a raw material containing a fluororesin and a non-fluororesin; obtaining a powder composition by pulverizing the kneaded product; forming a coating film by coating the powder coating material containing the powder composition on a surface to be coated; and curing the coating film. When the cross section of the cured film was observed from the side using two types of scanning electron microscopes described later, the ratio of the area of the upper layer mainly containing the fluororesin (main component) to the area of the entire surface of the cured film is 85% or more.

EXAMPLES

Hereinafter, the present invention will be described in more detail with reference to Examples and Comparative Examples. However, the present invention is not limited to these examples.

In each of the following examples, a fluororesin, a non-fluororesin, a curing agent, and other additives were mixed, melt-kneaded in a kneading extruder, and then pulverized to obtain a powder coating material. In addition, Examples 1 to 6 are Examples, and Examples 7 to 12 are Comparative Examples.

Production Example 1 (Production of Fluororesin)

50% by mass of xylene solution (20 mL) containing xylene (503 g), ethanol (142 g), CTFE (387 g), CHVE (326 g), HBVE (84.9 g), potassium carbonate (12.3 g), and tert-butyl peroxypivalate was introduced and heated in an autoclave, and a polymerization was carried out at 65° C. for 11 hours. Then, the solution in the autoclave was filtered to obtain a solution containing a fluororesin composed of a fluoropolymer. The resulting solution was vacuum dried at 65° C. for 24 hours to remove the solvent, and further vacuum dried at 130° C. for 20 minutes. The resulting block state fluororesin was pulverized to obtain a powdery fluororesin.

The resulting fluororesin was a polymer containing 50 mol %, 39 mol %, and 11 mol % of CTFE-based units, CHVE-based units, and HBVE-based units, respectively (hydroxyl group value: 50 mgKOH/g, glass transition temperature Tg: 52° C., melting point: 136° C., number average molecular weight Mn: 10,000, SP value: 18.6 $(J/cm^3)^{1/2}$)
[Each Component Used in the Production of the Powder Coating Composition]

The details of each component used in the production of the powder coating composition and the mass % of each component based on the total amount of the composition are shown below.

Fluororesin: Fluororesin produced in Production Example 1, 16% by mass

Non-fluororesin: polyester (manufactured by ALLNEX, trade name "CRYLCOAT (registered trademark) 4890-0", Mn: 2,500, softening temperature: 120° C., SP value: 22.8 $(J/cm)^{1/2}$), 36.7% by mass Curing agent: blocked isocyanate curing agent (manufactured by Degussa-Hnls AG, trade name "VESTAGON (registered trademark) B1530"), 9% by mass Pigment: DuPont, trade name "Ti-Pure (registered trademark) R960", titanium oxide content 89%, 33% by mass Curing catalyst: 100 times diluted xylene solution of dibutyltin dilaurate, 0.2% by mass Degassing agent: benzoin, 0.4% by mass Surface conditioner 1: manufactured by BYK, product name "BYK (registered trademark)-360P", 1.9% by mass Surface conditioner 2: manufactured by EASTMAN, trade name "Benzoflex (trademark) 352", 2.8% by mass Example 1 (Production of Powder Coating)

The above components were mixed for 10 seconds using a high-speed mixer (manufactured by Lingyu) to obtain a powdery mixture. Using the resulting mixture as a raw material, a twin-screw extruder (manufactured by Lingyu, a screw extruder with 25 mm diameter) was melt-kneaded under the following kneading conditions to obtain a kneaded product. The twin-screw extruder used is an extruder having the same configuration as that shown in FIG. 1. Further, the configuration of the screw 2, the configuration of each of the neutral kneading segment, and the non-neutral kneading segment are similar to those shown in FIGS. 2 to 4.

K value ($L_K/L_S \times 100$): 37.9%
N value ($L_N/L_K \times 100$): 60.6%
Number of neutral kneading segments: 4
$L_S/D_S$: 17.4
Barrel setting temperature: 120° C.
Screw rotation speed: 100 rpm The resulting kneaded product was gradually cooled to 23° C. and pulverized at 23° C. by using a pulverizer (Lingyu, trade name: DJ-05) to obtain a powder composition. The powder composition was classified by a 180-mesh to obtain a powder coating material (an average particle diameter was 90 μm).

Examples 2 to 12 (Production of Powder Coating Material)

Examples 2 to 12 were conducted in the same manner as in Example 1 except that the kneading conditions such as K value (%), N value (%), number of neutral kneading segments, and screw rotation speed were changed as shown in Table 1.
(Evaluation of Cured Film)
<Production of Test Piece>

The powder coating material obtained in each example was electrostatically coated on one surface of the chromate-treated aluminum plate using an electrostatic coating machine (manufactured by GEMA, trade name: Classic Standard). Then, the treated plate was cured in an atmosphere of 200° C. for 20 minutes, and cooled to 23° C. to obtain an aluminum plate on which a cured film having a thickness of 55 to 65 μm was formed. The resulting aluminum plate with a cured film (75 mm×150 mm) was used as a test piece for the evaluation described below. The results are shown in Table 1.

<Layer Separation Property>

The test piece was cut, and the cross section of the cured film was observed with the following two types of scanning electron microscopes (device 1 and device2). The cross section was observed under the following conditions.

Device 1: "JSM-5900LV" manufactured by JEOL Ltd.
 Acceleration voltage: 20 kV
 Magnification: 10,000 times
 Pre-measurement treatment: Platinum coating of 20 mA for 45 seconds by auto fine coater "JFC-1300" manufactured by JEOL Ltd. Device 2: "JCM-6000" manufactured by JEOL Ltd.
 Acceleration voltage: 15 kV
 Magnification: 10,000 times
 Pre-measurement treatment: Platinum coating of 20 mA for 60 seconds by auto fine coater "Smart Coater" manufactured by JEOL Ltd.

Based on the cross-sectional photographs obtained by both of the above devices, the quality of layer separation was determined according to the following criteria.

A: In the cross-sectional photograph, a clear interface between the fluororesin layer and the non-fluororesin layer was visually recognized, and it was confirmed that the fluororesin layer was continuously formed.

B: In the cross-sectional photograph, the interface between the fluororesin layer and the non-fluororesin layer was not visually recognized, or the fluororesin layer had a discontinuous portion.

Figure 5:
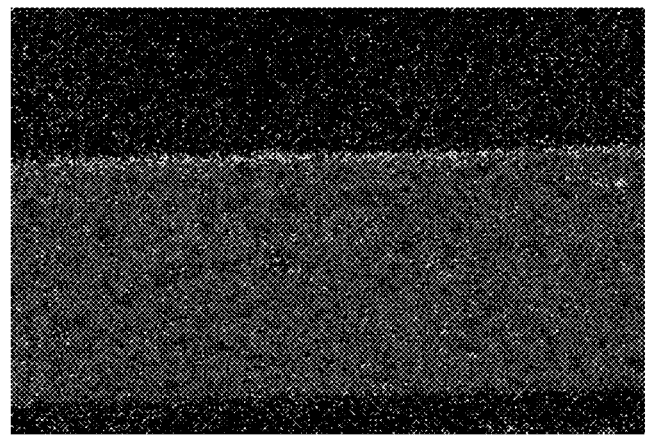
FIG. 5 is an electron micrograph of a cross section of a cured film formed using the powder coating material obtained by the production method according to one embodiment of the present invention.
Figure 6:
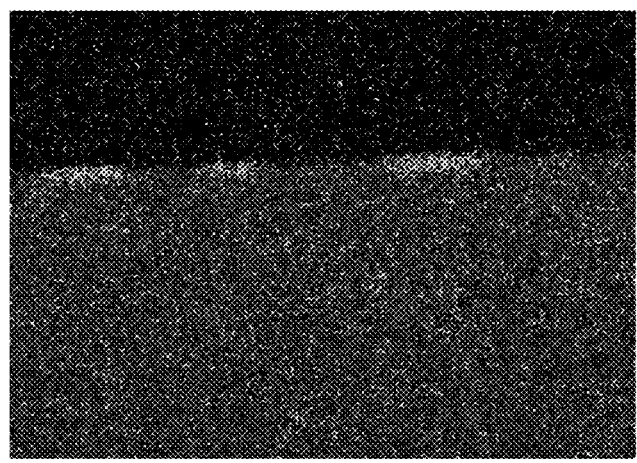
FIG. 6 is an electron micrograph of the cross section of the cured film formed using the powder coating material obtained by the conventional production method.

The evaluations of layer separation property for separation into two layers in Examples 1 to 12 were the same in the device 1 and the device 2. In addition, scanning electron micrographs of Example 6 and Example 12 taken by the device 1 are shown in FIGS. 5 and 6, respectively. Fluorine is shown in white in the photographs shown in FIGS. 5 and 6.

<Characteristics of the Surface of Cured Film>

In the cross-sectional photographs obtained by both of the above devices, the percentage of the surface area of the fluororesin layer, which is the uppermost layer, with respect to the total surface area of the surface of the cured film was visually calculated.

<Specular Gloss>

The specular glossiness (%) of the resulting test piece was measured when the cured film surface was subjected to a light with incident angle 60° in accordance with JIS K 5600-4-7. The measurement was performed using a test instrument (trade name "PG-1M" manufactured by Nippon Denshoku Industries Co., Ltd.) at three points such as upper, middle and lower parts of the test piece. The average value of the measured values was calculated.

<Appearance (Smoothness)>

The smoothness of the surface of the cured film in the test piece was evaluated by PCI (Powder Coating Institute) using a standard plate for visually evaluating smoothness according to the following criteria. The numerical value (PCI value) of the standard plate is 1 to 10, and the surface smoothness improves with increasing PCI value.

A: The PCI value was 3 or more, and poor repellency and poor wettability were not confirmed.

B: The PCI value was less than 3, and poor repellency and poor wettability were confirmed.

<Surface Hardness>

The pencil hardness of the cured film in the test piece was measured in accordance with JIS K5600-5-4.

<Impact Resistance>

According to JIS K 5600-5-3, the resistance of the cured film to a drop height of 5 to 100 cm of a weight of 500 g was evaluated by the maximum drop height (cm) at which peeling of the cured film did not occur. The greater the maximum drop height was, the impact resistance was excellent.

<Bending Resistance>

According to JIS K 5600-5-1, the resistance of the cured film, when the cured film of the test piece was wrapped around the cylindrical mandrel of the specified diameter, was evaluated at the minimum diameter (mm) of cylindrical mandrel which does not cause cracks on the cured film. The smaller the minimum diameter of the cylindrical mandrel was, the bending resistance was excellent.

TABLE 1

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Condition of kneading | K value ($L_K/L_S$) × 100(%) | 37.9 | 37.9 | 37.9 | 32.2 | 32.2 | 32.2 | 55.1 | 55.1 | 55.1 | 20.7 | 20.7 | 20.7 |
| | N value ($L_K/L_S$) × 100(%) | 60.6 | 60.6 | 60.6 | 53.6 | 53.6 | 53.6 | 72.9 | 72.9 | 72.9 | 27.8 | 27.8 | 27.8 |
| | Number of neutral kneading segments | 4 | 4 | 4 | 3 | 3 | 3 | 7 | 7 | 7 | 1 | 1 | 1 |
| | Barrel setting temperature (° C.) | 120 | 120 | 120 | 120 | 120 | 120 | 120 | 120 | 120 | 120 | 120 | 120 |
| | $L_S/D_S$ | 17.9 | 17.9 | 17.9 | 17.9 | 17.9 | 17.9 | 17.9 | 17.9 | 17.9 | 17.9 | 17.9 | 17.9 |
| | Screw rotation speed (rpm) | 100 | 300 | 500 | 100 | 300 | 500 | 100 | 300 | 500 | 100 | 300 | 500 |
| Evaluation result of cured film | Layer separation property | A | A | A | A | A | A | B | B | B | B | B | B |
| | Coating surface characteristics (%) | 95 | 95 | 95 | 90 | 90 | 90 | 60 | 60 | 60 | 40 | 40 | 40 |
| | Specular gloss (%) | 89.2 | 88.5 | 91.0 | 89.6 | 94.3 | 93.1 | 86.2 | 88.1 | 90.0 | 85.3 | 90.7 | 89.4 |
| | Appearance (PCI value) | 4 | 4 | 4 | 4 | 4 | 4 | 2 | 4 | 4 | 2 | 2 | 2 |
| | Surface hardness | 2H | 2H | 2H | 2H | 2H | 2H | H | 2H | 2H | 2H | 2H | 2H |
| | Impact resistance (cm) | 20 | 20 | 20 | 20 | 20 | 20 | 10 | 20 | 5 | 15 | 10 | 15 |
| | Bending resistance (cm) | 16 | 16 | 16 | 16 | 16 | 16 | 32 | 16 | 32 | 25 | 32 | 20 |

From Table 1, Examples 1 to 6 in which the K value ($L_K/L_S$×100) was 21.0 to 50.0% showed high layer separation property in the cross section of the cured film. From this result, according to the production method of the present embodiment, the resulting cured film exhibited high layer separation property at any screw rotation speed of 100 rpm, 300 rpm, and 500 rpm. In addition, Examples 1 to 6 showed the same or higher glossiness, smoothness, surface hardness, impact resistance, and bending resistance as Examples 7 to 12.

DESCRIPTION OF THE REFERENCE NUMERALS

- 1 Barrel
- 2 Screw
- 3 Supply unit
- 5 Die
- 6 Motor unit
- 10 Kneading extruder
- 21 Transport zone
- 22 Kneading zone
- 23 Metering zone
- 24 Neutral zone
- 25 Non-neutral zone
- 41 Transport segments
- 42 kneading segments
- 44 Neutral kneading segments
- 45, 45A, 45B Non-neutral kneading segment
- 441 to 444 Kneading discs of neutral segment (kneading disc)
- 451 to 454 Kneading discs of non-neutral segment (kneading disc)
- $D_{M1}$ Major axis of non-neutral segment
- $D_{M2}$ Minor axis of non-neutral segment
- $D_{N1}$ Major axis of neutral segment
- $D_{N2}$ Minor axis of neutral segment
- $D_e$ Diameter of screw (outer diameter)
- $L_K$ Length of kneading zone
- $L_N$ Length of neutral zone
- $L_R$ Length of non-neutral zone
- $L_S$ Effective length of screw
- $P_M$ Axial length of non-neutral segment (pitch)
- $P_N$ Axial length of neutral segment (pitch)
- $W_M$ Disc width of non-neutral segment
- $W_N$ Disc width of neutral segment

The invention claimed is:

1. A method of producing a powder coating material containing a fluororesin and a non-fluororesin, the method comprising:
kneading a raw material containing the fluororesin and the non-fluororesin with a kneading extruder equipped with at least one screw having a kneading zone,
wherein
a ratio of a length $L_K$ of the kneading zone to an effective length $L_S$ of the screw ($L_K/L_S \times 100$) is 21.0 to 50.0%,
a value of a ratio of the effective length $L_S$ of the screw to an outer diameter $D_S$ of the screw ($L_S/D_S$) is 10 to 30,
the kneading zone includes a neutral zone equipped with at least one neutral kneading segment, and
a ratio of a length $L_N$ of the neutral zone to the length $L_K$ of the kneading zone ($L_N/L_K \times 100$) is 30% or more.

2. The method according to claim 1, wherein the screw is rotated at a rotational speed of 10 to 1,000 rpm.

3. The method according to claim 1, wherein the neutral kneading segment is equipped with a plurality of kneading discs.

4. The method according to claim 1, wherein the kneading extruder is a twin-screw extruder or a multi-screw extruder having three or more screws.

5. The method according to claim 1, wherein the raw material is kneaded at a temperature above either a glass transition temperature of the fluororesin or a glass transition temperature of the non-fluororesin and below a temperature at which curing of the raw material initiates.

6. The method according to claim 1, wherein the raw material is kneaded at a temperature of 100° C. or above and 300° C. or below.

7. The method according to claim 1, wherein the non-fluororesin is one or more selected from the group consisting of a polyester resin, an acrylic resin, an epoxy resin, and a polyethylene resin.

8. The method according to claim 1, wherein the fluororesin contains a fluoropolymer containing units based on a fluoroolefin and units based on monomers not containing a fluorine atom.

9. The method according to claim 1, wherein
the fluororesin contains a fluoropolymer containing units based on a fluoroolefin and units based on monomers not containing a fluorine atom, and
the units based on monomers not containing a fluorine atom includes units based on monomers having a crosslinkable group.

10. The method according to claim 1, wherein the fluororesin and non-fluororesin have one of a hydroxyl value and an acid value, or have both.

11. The method according to claim 1, wherein a content of the fluororesin in the raw material is 5 to 95% by mass.

12. The method according to claim 1, wherein a mass ratio of the fluororesin and the non-fluororesin in the raw material is 70/30 to 10/90.

13. The method according to claim 1, wherein the raw material contains a curing agent.

14. The method according to claim 1, wherein the $L_N/L_K$ ratio is 60% or more.

15. The method according to claim 1, wherein the kneading zone further includes a non-neutral zone equipped with at least one non-neutral kneading segment.

16. The method according to claim 15, wherein the non-neutral kneading segment is equipped with a plurality of discs and is at least one selected from the group consisting of a forward feed type screw and a reverse feed type screw.

17. A method of producing a powder coating material containing a fluororesin and a non-fluororesin, the method comprising: kneading a raw material containing the fluororesin and the non-fluororesin with a kneading extruder equipped with at least one screw having a kneading zone and a metering zone downstream of the kneading zone, wherein the screw is rotated at a rotational speed of 100 to 1,000 rpm, a ratio of a length $L_K$ of the kneading zone to an effective length Ls of the screw (LK/Ls×100) is 21.0 to 50.0%, and a value of a ratio of the effective length Ls of the screw to an outer diameter Ds of the screw (Ls/Ds) is 10 to 30.

18. A method of producing a powder coating material containing a fluororesin and a non-fluororesin, the method comprising:
kneading a raw material containing the fluororesin and the non-fluororesin with a kneading extruder equipped with at least one screw having a kneading zone,
wherein
the screw is rotated at a rotational speed of 100 to 1,000 rpm,
a ratio of a length $L_K$ of the kneading zone to an effective length $L_S$ of the screw ($L_K/L_S \times 100$) is 21.0 to 50.0%,
the kneading zone includes a neutral zone equipped with at least one neutral kneading segment, and
a ratio of a length $L_N$ of the neutral zone to the length $L_K$ of the kneading zone ($L_N/L_K \times 100$) is 30% or more.

* * * * *